United States Patent [19]

Jordan et al.

[11] Patent Number: 5,751,139
[45] Date of Patent: May 12, 1998

[54] MULTIPLEXING POWER CONVERTER

[75] Inventors: Mark George Jordan, Goffstown; Francis H. Terry, Windham; Thomas Peter Hack, Bedford, all of N.H.

[73] Assignee: Unitrode Corporation, Merrimack, N.H.

[21] Appl. No.: 814,679

[22] Filed: Mar. 11, 1997

[51] Int. Cl.[6] .................................................. G05F 1/10
[52] U.S. Cl. .................................... 323/222; 323/282
[58] Field of Search .............................. 323/222, 223, 323/282, 283, 284, 351

[56] References Cited

U.S. PATENT DOCUMENTS

| | | | |
|---|---|---|---|
| 3,582,756 | 6/1971 | McMurray | 321/5 |
| 3,745,440 | 7/1973 | Lord | 321/26 |
| 5,063,490 | 11/1991 | Maehara et al. | 363/37 |
| 5,218,174 | 6/1993 | Gray et al. | 178/19 |
| 5,225,767 | 7/1993 | Gulczynski | 323/282 |
| 5,357,419 | 10/1994 | Limpaecher | 363/140 |
| 5,396,165 | 3/1995 | Hwang et al. | 323/210 |
| 5,467,010 | 11/1995 | Quarmby et al. | 323/284 |
| 5,627,455 | 5/1997 | Jacobs et al. | 323/222 |

Primary Examiner—Stuart N. Hecker
Assistant Examiner—Y. J. Han
Attorney, Agent, or Firm—Weingarten, Schurgin, Gagnebin & Hayes LLP

[57] ABSTRACT

A multiplexing power converter for use with a single inductor for providing multiple power outputs is disclosed. The multiplexing power converter includes first switching means for providing a first low resistance path for current to flow from a power source through an inductor so as to energize the inductor, and at least one second switching means for providing at least one second low resistance path for current to flow from the inductor so as to deenergize the inductor and provide an output current. Only one low resistance current path is provided at any one time.

45 Claims, 14 Drawing Sheets

5,751,139

MULTIPLEXING POWER CONVERTER

FIELD OF THE INVENTION

The present invention relates generally to power conversion and, more particularly, to a multiplexing power converter for use with a single inductor for providing multiple power outputs.

BACKGROUND OF THE INVENTION

Portable electronic applications typically require small, high-efficiency power converters. Oftentimes, such applications also require that the power converters provide multiple outputs. To date, however, multiple-output power converters have typically required multiple inductors or multiple transformer windings, one for each output, wherein each inductor or transformer winding utilizes a relatively large amount of circuit area. A conflict is thus presented in providing multiple-output power converters which are small in size.

To avoid such a conflict, it would be desirable to provide a multiple-output power converter which does not require multiple inductors or multiple transformer windings. More particularly, it would be desirable to provide a power converter which requires only a single inductor to provide multiple power outputs.

BRIEF SUMMARY OF THE INVENTION

The present invention contemplates a multiplexing power converter for use with a single inductor for providing multiple power outputs. The power converter includes first switching means for providing a first low resistance path for current to flow from a power source through an inductor so as to energize the inductor, and at least one second switching means for providing at least one second low resistance path for current to flow from the inductor so as to deenergize the inductor and provide an output current. Only one low resistance current path is provided at any one time. Thus, in accordance with the present invention, a single inductor is multiplexed between several power outputs to reduce the size and total parts count of a power converter.

In addition, the present invention includes a technique for developing a bootstrap voltage for high-side switching which allows a power converter to start-up with voltages less than or equal to one volt over temperature and circuit tolerances and to continue to operate at even lower voltages once started. Also, the present invention includes a technique for reversing inductor current and developing an output voltage of opposite polarity to the input voltage. Hysteretic control of the output voltage serves as the basis for the present invention.

From the above descriptive summary it is apparent how the present invention overcomes the shortcomings of the above-mentioned prior art.

Accordingly, the primary object of the present invention is to provide a multiplexing power converter for use with a single inductor for providing multiple power outputs.

The above primary object, as well as other objects, features, and advantages, of the present invention will become readily apparent from the following detailed description which is to be read in conjunction with the appended drawings.

BRIEF DESCRIPTION OF THE SEVERAL VIEWS OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF THE INVENTION

Figure 1:
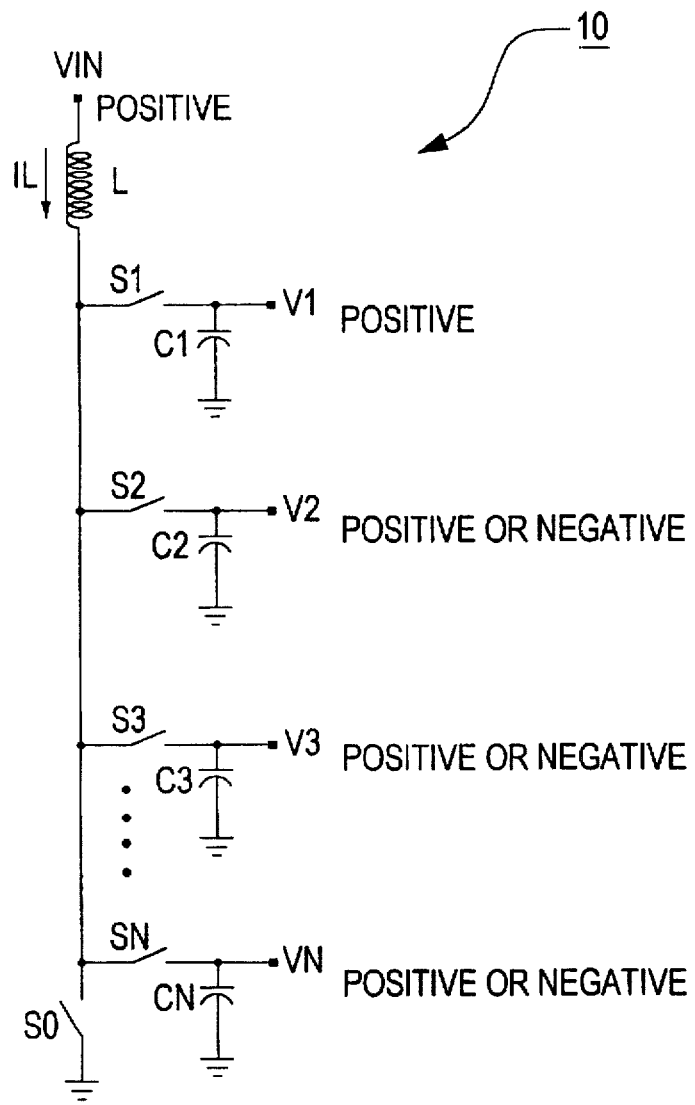
FIG. 1 is a simplified schematic representation of a power converter utilizing a multiplexing technique in accordance with the present invention.

Referring to FIG. 1, there is shown a simplified model of a power converter 10 utilizing a multiplexing technique in accordance with the present invention. The power converter 10 comprises a switch, $S_o$, for charging an inductor, L, from a power source, $V_{IN}$. The power converter also comprises switches, $S_1$–$S_N$, for controlling the flow of energy to output filter capacitors, $C_1$–$C_N$, and outputs, $V_1$–$V_N$, respectively.

In its simplest form, the power converter 10 provides output voltage values at outputs $V_1$–$V_N$ which are of the same polarity as that of $V_{IN}$ (e.g., a positive voltage value or a negative voltage value). The output voltage value at each output is compared to two reference voltages (i.e., an upper hysteretic control point and a lower hysteretic control point) to determine whether each output voltage value is within an acceptable range or additional energy must be received from the inductor L. The outputs $V_1$-$V_N$ are prioritized to determine which output will be serviced during any given boost phase, as described in detail below. In this simplest form of the power converter 10, the outputs $V_1$-$V_N$ are all given a single priority wherein output $V_1$ is given the highest priority, output $V_2$ is given the second highest priority, and so on down to output VN which is given the least highest priority.

Figure 2:
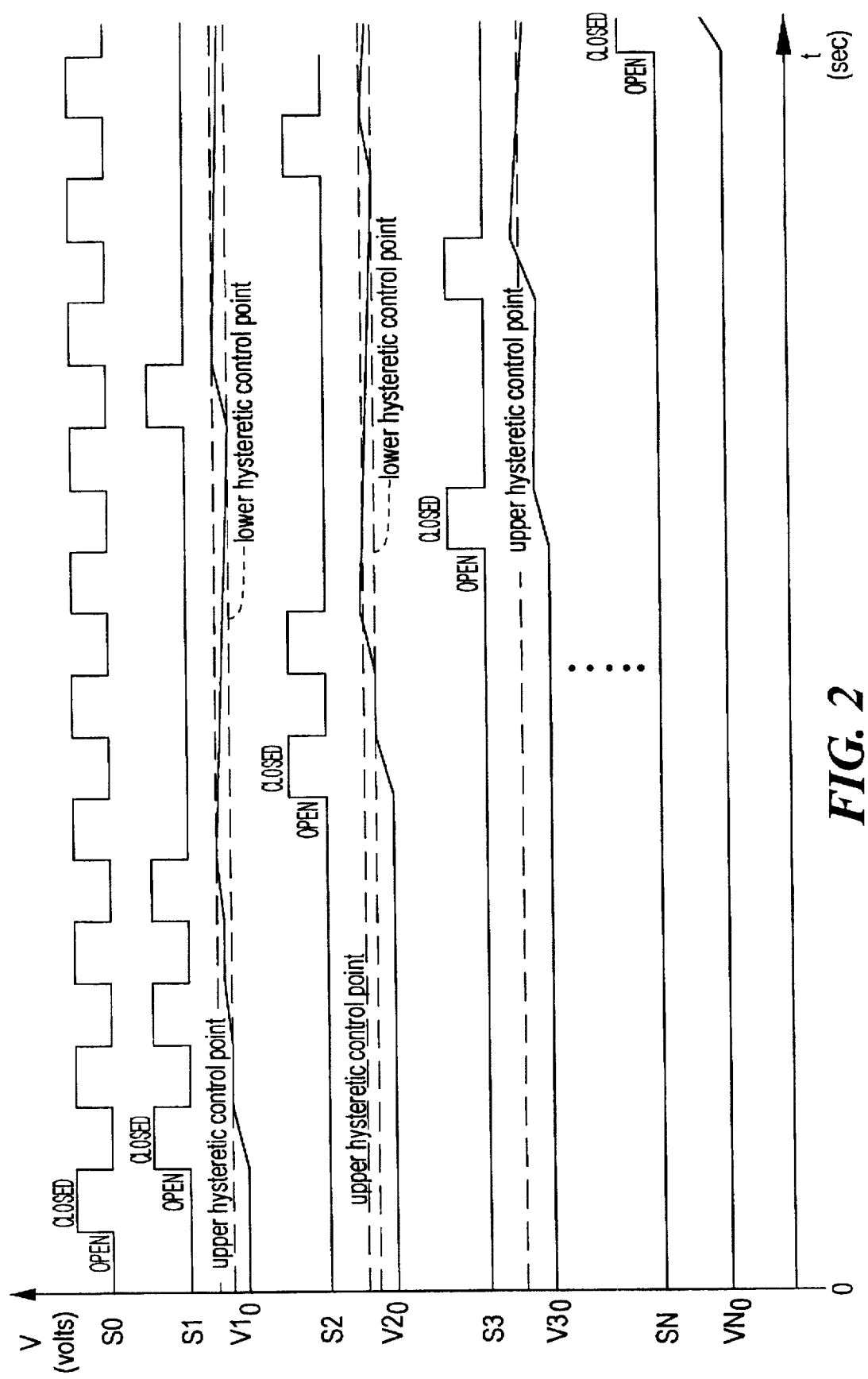
FIG. 2 is a timing diagram illustrating how positive output voltages are derived utilizing the power converter shown in FIG. 1.

Referring to FIG. 2, a timing diagram is provided to illustrate how the power converter 10 functions to provide positive output voltages. At t=0, all of the output filter capacitors $C_1$-$C_N$ are fully discharged (i.e., $V_1$=0, $V_2$=0, $V_3$=0 ... $V_N$=0), all of the switches $S_0$-$S_N$ are open, and the power source $V_{IN}$ is at full potential. Shortly thereafter, the power converter 10 operates by closing switch $S_0$ so that power source $V_{IN}$ may begin charging inductor L. After inductor L has stored a suitable amount of energy during what is termed the "charge phase", switch $S_0$ opens. At the same time, one of the other switches closes depending upon the value of the output voltage at each output. Since all of the output voltages values were initially equal to zero, and output $V_1$ was assigned the highest priority, switch $S_1$ closes, thereby allowing current from inductor L to flow towards output $V_1$ and charge output filter capacitor $C_1$. At some later time (which may be determined by a $T_{ON}$ timer, a peak inductor current comparator, or some other circuit as described below), switch $S_1$ opens and switch $S_0$ closes, thereby terminating what is called the "boost phase".

After the boost phase has been terminated, another charge phase begins so that power source $V_{IN}$ may again charge inductor L for another boost phase. At the completion of the second charge phase, switch $S_0$ opens and the switch associated with the highest priority output having an output voltage value that either has not yet surpassed its upper hysteretic control point or is presently below its lower hysteretic control point will close. That is, if the output voltage value at output $V_1$ has never surpassed its upper hysteretic control point during any previous boost phase, then $S_1$ will close. Also, if the output voltage value at output $V_1$ has previously surpassed its upper hysteretic control point but has subsequently fallen below its lower hysteretic control point, then $S_1$ will close. However, if the output voltage value at output $V_1$ has previously surpassed its upper hysteretic control point and has not subsequently fallen below its lower hysteretic control point, and the output voltage value at output $V_2$ has never surpassed its upper hysteretic control point during any previous boost phase, then $S_2$ will close. Also, if the output voltage value at output $V_1$ has previously surpassed its upper hysteretic control point and has not subsequently fallen below its lower hysteretic control point, and the output voltage value at output $V_2$ has previously surpassed its upper hysteretic control point but has subsequently fallen below its lower hysteretic control point, then $S_2$ will close. The power converter 10 operates in the above-described manner so as to service all of the outputs $V_1$-$V_N$. Thus, the power converter 10 operates in a priority-based manner wherein an output is serviced based upon whether that output is the highest priority output that has an output voltage value that either has not yet surpassed its upper hysteretic control point or is below its lower hysteretic control point at the start of the next boost phase.

After all of the outputs have been serviced so that their output voltage values have initially surpassed their upper hysteretic control point and are now within an acceptable range (e.g., between an upper hysteretic control point and a lower hysteretic control point), the power converter 10 enters an idle state until the output voltage value of one or more of the outputs drop below its acceptable range. At that point, the power converter 10 will charge inductor L and service the highest priority output having an output voltage value that has fallen below its lower hysteretic control point.

As indicated above, in the example of FIG. 2 all of the output voltage values are initially set to zero. In this example, three boost phases are required to bring the output voltage value of the highest priority output (output $V_1$) to its upper hysteretic control point. The next two boost phases are required to bring the output voltage value of the second highest priority output (output $V_2$) to its upper hysteretic control point. During the next boost phase, however, the output voltage value of the third highest priority output (output $V_3$) is brought only to a point that is well below its upper hysteretic control point.

Before the start of the next boost phase, the output voltage value at output $V_1$ drops below its lower hysteretic control point. Since output $V_1$ has a higher priority than output $V_3$, the next boost phase is used to bring the output voltage value at output $V_1$ to its upper hysteretic control point. The next boost phase is then used to bring the output voltage value at output $V_3$ to its upper hysteretic control point, and the subsequent boost phase is used to bring the output voltage value at output $V_2$ to its upper hysteretic control point due to its falling below its lower hysteretic control point. Finally, with the output voltage values at outputs $V_1$-$V_3$ within their acceptable ranges, the next boost phase is used to bring the output voltage value at output $V_N$ to its upper hysteretic control point. It should be noted that the output voltage values of all of the outputs $V_1$-$V_N$ are brought to their upper hysteretic control points by charging the corresponding output filter capacitors $C_1$-$C_N$, respectively.

The simplified power converter 10 of FIG. 1 can also be used to provide negative output voltages. For example, assume that the output voltage value at output $V_1$ is positive and that it supplies a heavy load. Also assume that the power converter 10 operates in a discontinuous mode and that only outputs $V_1$ and $V_2$ are present.

Figure 3:
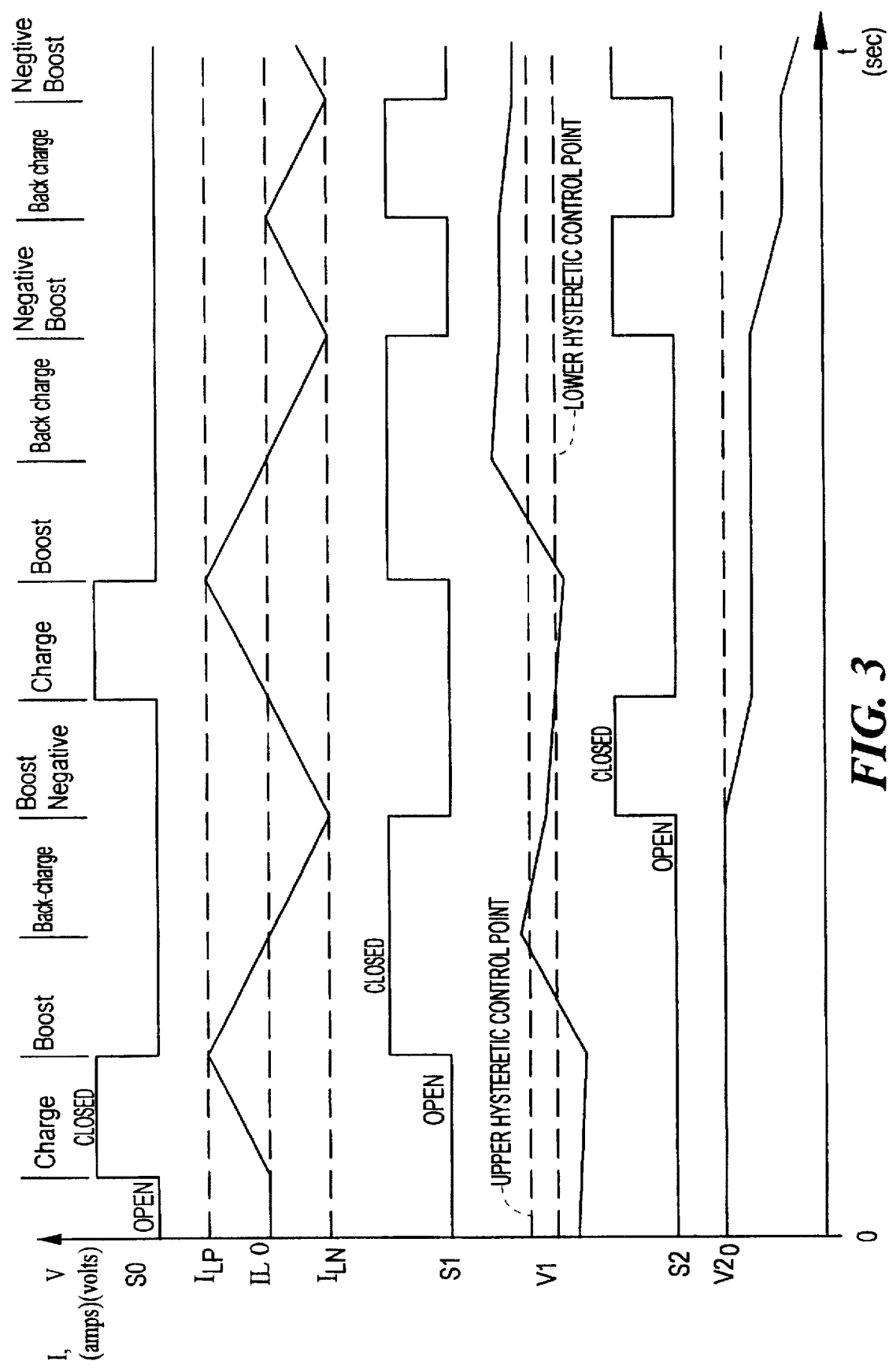
FIG. 3 is a timing diagram illustrating how negative output voltages are derived utilizing the power converter shown in FIG. 1.

Referring to FIG. 3, a timing diagram is provided to illustrate how the power converter 10 functions to provide negative output voltages. At t=0, it can be assumed that the power converter 10 has been operating for some time and that the output voltage value at output $V_1$ is slightly below its lower hysteretic control point. The power converter 10 first acts to close switch $S_0$ so that power source $V_{IN}$ may begin charging inductor L. The charging of inductor L is indicated by the increasing value of current $I_L$. When a suitable amount of energy has been stored in inductor L, switch $S_0$ opens and switch $S_1$ closes thereby transferring the energy stored in inductor L to output $V_1$ and bringing the output voltage value at output $V_1$ to its upper hysteretic control point and beyond.

When the inductor current $I_L$ reaches zero, a different charge phase termed the "back-charge phase" begins. At this point, it is assumed that the output voltage value at output $V_1$ is greater than the voltage value of power source $V_{IN}$. Thus, during the back-charge phase, current flows from output capacitor $C_1$ back to inductor L. Of course, switch $S_1$ must remain closed during the back-charge phase. The back-charge phase has the effect of transferring from output capacitor $C_1$ to inductor L some of the energy that was initially transferred from inductor L to output capacitor $C_1$ in order to bring the output voltage value at output $V_1$ to its upper hysteretic control point and beyond.

When the inductor current $I_L$ has reached its most negative value, $I_{LN}$, switch $S_1$ opens and switch $S_2$ closes so as to begin what is termed the "negative boost phase". During the negative boost phase, the "negative" energy stored in inductor L is transferred to output $V_2$ via switch $S_2$ so as to make the output voltage at output $V_2$ negative in value. The value of the maximum negative inductor current $I_{LN}$ is predetermined and controlled by the power converter 10. The negative boost phase is terminated when the value of the inductor current $I_L$ reaches zero.

The value of the output voltage at output $V_1$ may drop below its lower hysteretic control point while output $V_2$ is being serviced. If this occurs, as indicated in FIG. 3, the power converter 10 will initiate a charge phase and then a boost phase so as to bring the output voltage value at output $V_1$ to its upper hysteretic control point and beyond. After the output voltage value at output $V_1$ surpasses its upper hysteretic control point and the inductor current $I_L$ reaches zero, the power converter 10 enters another back-charge phase and then another negative boost phase so as to boost the output voltage at output $V_2$ to a more negative value.

Since the value of the output voltage at output $V_1$ is still above its lower hysteretic control point at the end of the second negative boost phase, which occurs when the value of the inductor current $I_L$ reaches zero, the power converter 10 enters still another back-charge phase and then another negative boost phase so as to boost the output voltage at output $V_2$ to an even greater negative value.

At this point it should be noted that the charge phases described above in both FIGS. 2 and 3 are maintained for a time period during which the value of the inductor current $I_L$ increases from a starting point of zero to a maximum positive value, $I_{LP}$. The value of the maximum positive inductor current $I_{LN}$ is predetermined and controlled by the power converter 10.

It should also be noted that the inductor current waveform shown in FIG. 3 is simplified. In an actual circuit, the charge and discharge portions of the waveform will not be perfectly linear due to inductor equivalent series resistance (ESR), inductor on-resistances, and other effects. Also, the slope of the inductor current $I_L$ for the charge, back-charge, boost, and negative boost phases will usually differ from one another, and vary somewhat over time, since they are all related to the voltages impressed across inductor L during each phase.

With slightly more circuitry than is shown in FIG. 1, it is possible to create a power converter that can start up and operate down to extremely low voltages. Such additional circuitry includes a start-up oscillator which is used to initially drive switch $S_0$. Thereafter, one of the outputs, $V_1$-$V_N$, are used for a "bootstrap" voltage for pulse width modulator control circuitry. During start-up, the bootstrap voltage is produced, and then control of switch $S_0$ is passed from the start-up oscillator to a pulse width modulator. If the bootstrap voltage output is assigned the highest priority, the pulse width modulator will operate until the energy available from the input power source $V_{IN}$ can no longer supply the energy required.

By careful selection of the value of the inductor and other circuit parameters (such as a $T_{ON}$ timer limit or a peak inductor current comparator threshold, if applicable) it is possible to operate the power converter 10 well below the input voltage required for initial start-up. The start-up voltage can also be made very low since it is limited only by the voltage required to turn on switch $S_0$ (which will usually be a MOSFET or bipolar transistor) and the minimum operating voltage of the start-up oscillator.

The multiplexing technique described above may be adapted to buck, SEPIC, flyback, quasi-resonant, and resonant topologies. Also, auxiliary supplies can be designed using this technique for developing FET drive signals. It is also possible to use this technique in a power converter that operates in both continuous and discontinuous conduction modes to achieve high low-end and high-end efficiencies.

The above-described multiplexing technique can be easily realized in integrated circuit form. For example, referring to FIG. 4, there is shown a block diagram schematic of a low input voltage single inductor boost converter 20 in integrated circuit form along with some associated application circuitry, all of which incorporate the concepts of the above-described multiplexing technique. The converter 20 comprises a modulator control circuit 22, start-up circuitry 24, a MOSFET charging switch 26, and a MOSFET boosting switch 28. The associated application circuitry comprises a DC power source 30, an inductor 32, a flyback diode 34, a power source storage capacitor 36, a gate drive voltage storage capacitor 38, an output voltage storage capacitor 40, and an input power limiting termination resistor 42.

The connections between the internal circuitry of the converter 20 and the external application circuitry include an input voltage connection, VIN, which supplies input voltage to the converter 20 during start-up. After the converter 20 begins to provide an acceptable output voltage, the converter 20 draws power from the VOUT and the VGD connections.

The converter 20 also has a switch connection, SW, which is connected to the input voltage connection VIN through the inductor 32, and is connected to the VGD connection through the flyback diode 34. When transferring energy to the VOUT connection, the SW connection will first be essentially grounded through the MOSFET charging switch 26, so as to charge the inductor 32. The SW connection will then be connected to the VOUT connection through the MOSFET boosting switch 28, so as to boost the output voltage at the VOUT connection. When transferring energy to the VGD connection, after the inductor 32 has been charged via the MOSFET charging switch 26, the MOSFET boosting switch 28 stays off, thereby allowing energy from the inductor 32 to be diverted to the VGD connection through the flyback diode 34. During discontinuous periods of the inductor current, an additional MOSFET switch (see FIG. 5) resistively connects SW to VIN so as to dampen excess circulating energy and thereby eliminate undesired high frequency ringing.

The gate drive connection, VGD, is coarsely regulated around 9 V and is primarily used for supplying drive current to the MOSFET switches 26 and 28 in the converter 20. The voltage value at the VGD connection can be as low as 7.5 V without interfering with the servicing of the VOUT connection. Below 7.5 V, however, the VGD connection will have the highest priority, although practically the voltage should not decay to that level if the gate drive voltage storage capacitor 38 is sized properly.

The output voltage connection, VOUT, has highest priority in the multiplexing technique of the converter 20, as long as the value of the voltage at the VGD connection is above the critical level of 7.5 V. The output voltage is typically 3.3 V, 5 V, or it can be adjustable, as will be described in detail below. The VOUT connection can typically provide over 150 mA to loads with a 1 V power source 30.

A shutdown connection, SD, is provided for putting the converter 20 into a sleep or shutdown mode when the SD connection is open. A built-in current source pulls up on this connection. When this connection is tied to ground, the converter 20 is enabled.

An input power limiting connection, PLIM, is provided for programming the maximum input power that is allowable for the converter 20. For example, a 1 A current limit at 1 V would have a 333 mA current limit at 3 V keeping the input power constant at 1 W. The peak current at VIN=1 V is programmed to be 1.5 A (1.5 W) when this connection is grounded. The peak power limit is given by $$PL(W) = \frac{14.5}{R_{PL} + 6.5}$$

wherein $R_{PL}$ is the value of the input power limiting termination resistor 42 connected from the PLIM connection to ground. The peak current limit is given by $$I_{PK}(A) = \frac{14.5}{VIN(R_{PL} + 6.5)}$$

Constant power gives several advantages over constant current such as lower output ripple.

The converter 20 also has a power ground connection, PGND, and a signal ground connection, SGND. The charging current for the inductor 32 flows through the PGND connection, while the circuitry in the modulator control circuit 22 and the start-up circuitry 24 utilize the SGND connection.

Figure 4:
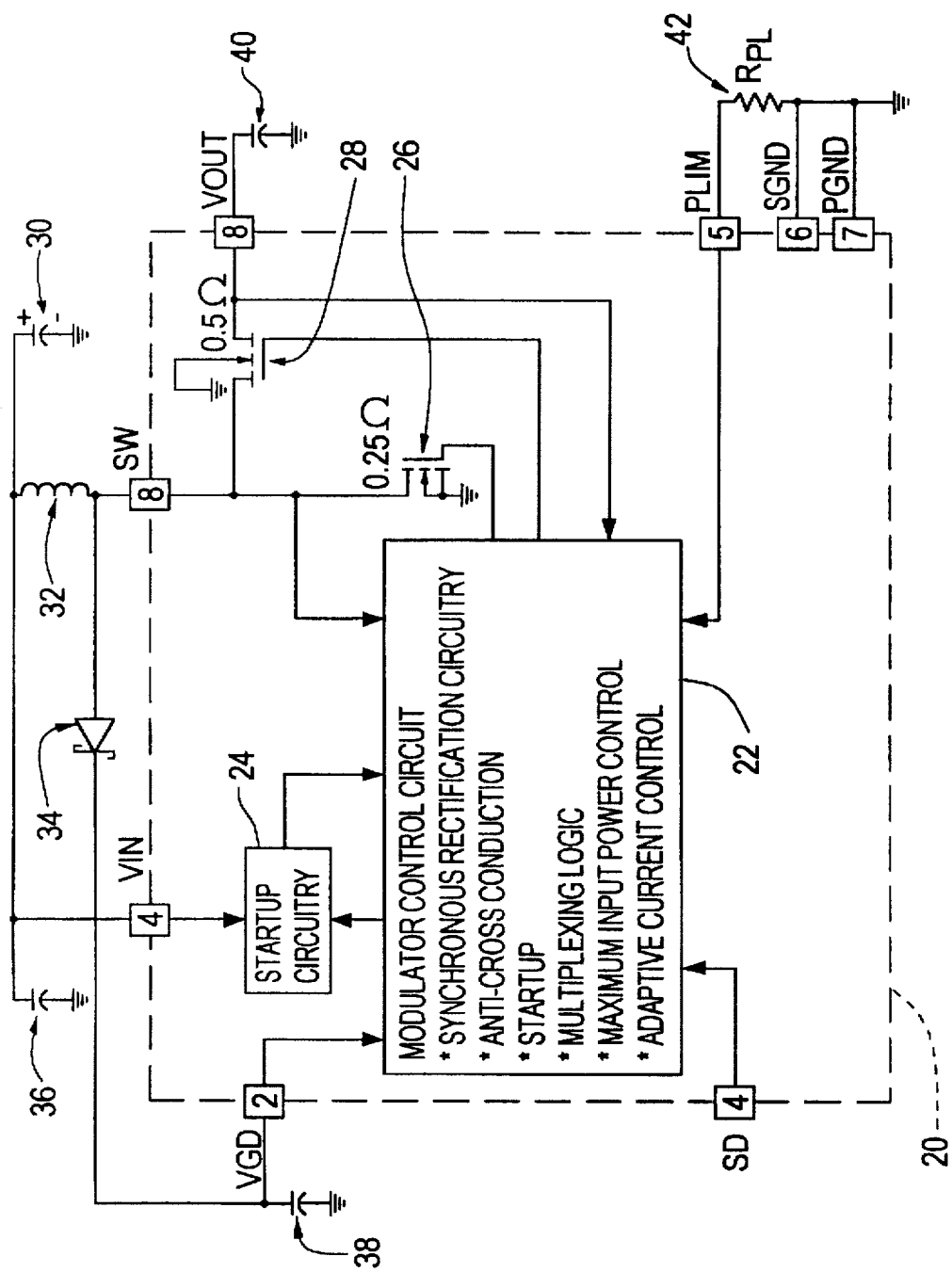
FIG. 4 is a simplified schematic diagram of a low input voltage, single inductor boost converter which incorporates the concepts of a multiplexing technique in accordance with the present invention.
Figure 5:
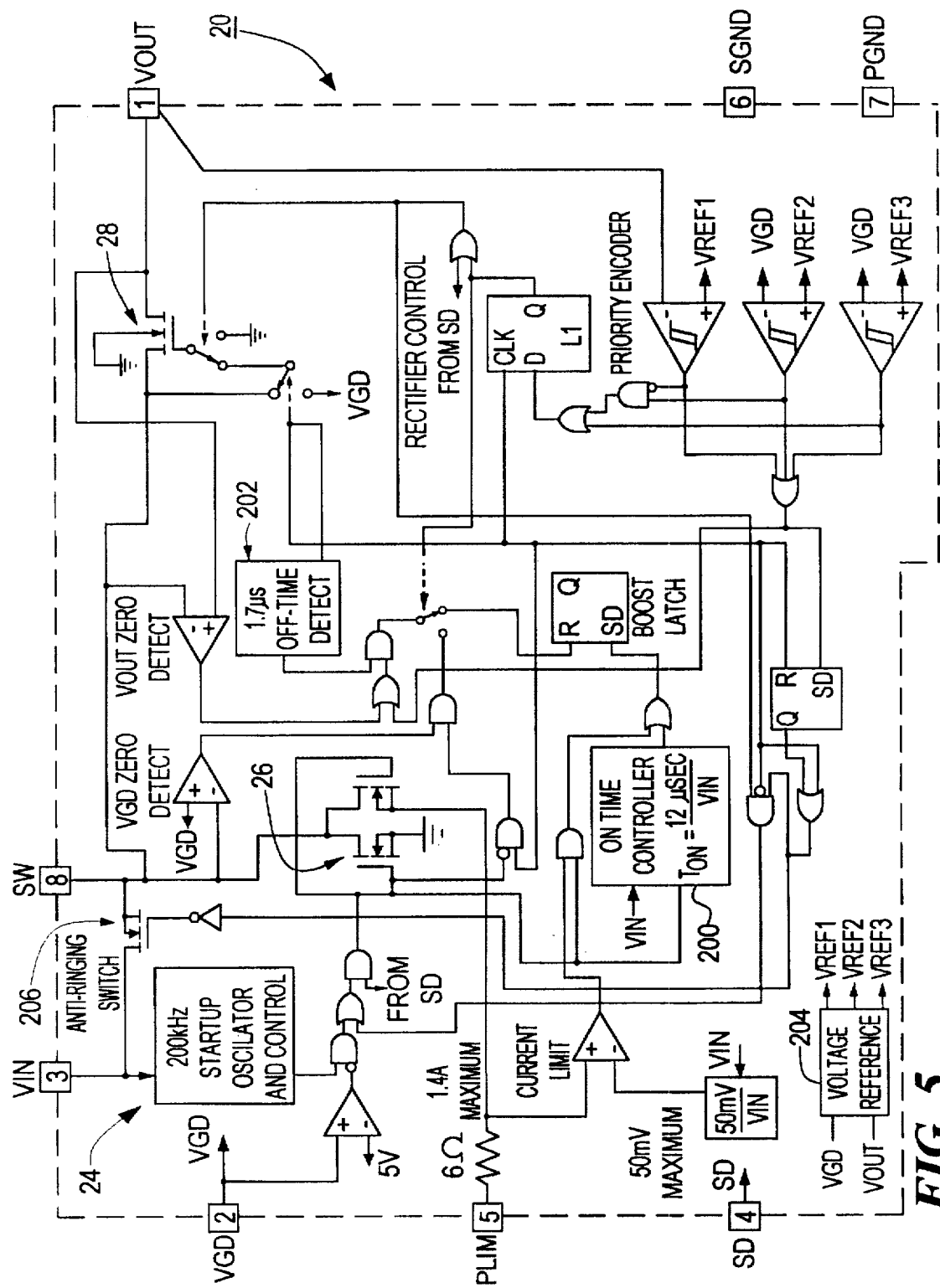
FIG. 5 is a detailed schematic diagram of the low input voltage, single inductor boost converter shown in FIG. 4.

Referring to FIG. 5, a more detailed schematic diagram of the converter 20 shown in FIG. 4 is provided. In particular, the individual components of the modulator control circuit 22 are shown comprising an on-time controller 200, an off-time controller 202, a voltage reference 204, and an anti-ringing switch 206.

Figure 6:
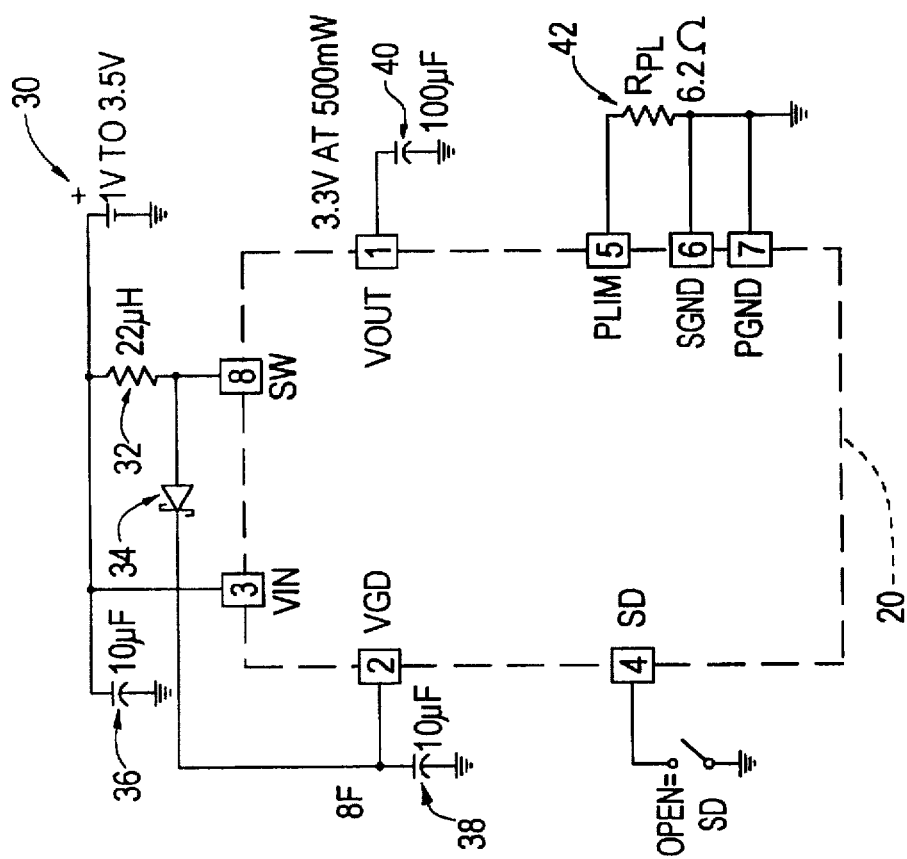
FIG. 6 is a schematic diagram of an application circuit utilizing the low input voltage single inductor boost converter shown in FIG. 4.

Referring to FIG. 6, the converter 20 is shown in block diagram form and specific application circuitry is shown connected to the converter 20 for providing a 3.3 V output at 500 mW at the VOUT connection.

Figure 7:
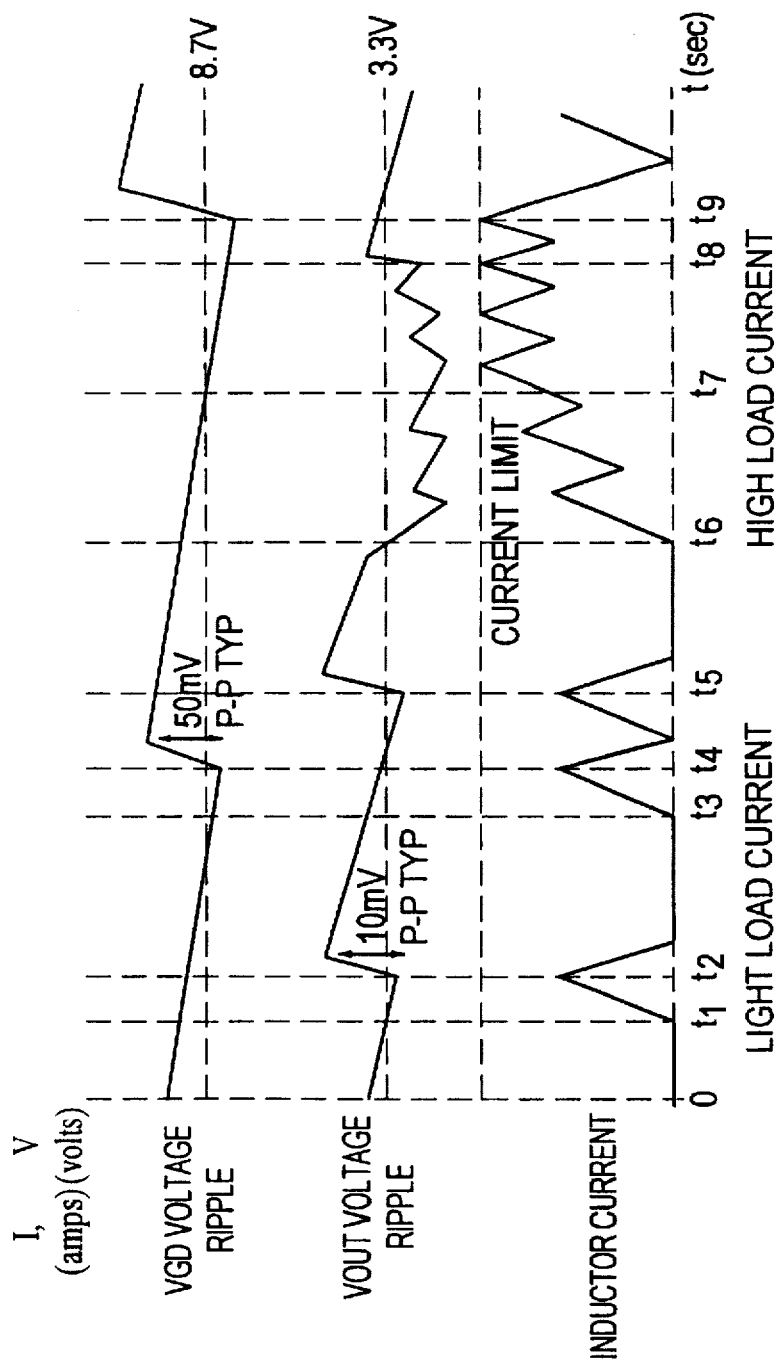
FIG. 7 is a timing diagram illustrating the function of the low input voltage single inductor boost converter in the application circuit of FIG. 6.

Referring to FIG. 7, a timing diagram is provided for the application circuit shown in FIG. 6. At time $t_1$, the voltage level at the VOUT connection drops below its lower voltage threshold, and the inductor 32 is charged with an on-time determined by $$T_{ON} = \frac{12 \, \mu sec}{VIN}$$

For a 1.25 V input, and a 22 μH inductor, the resulting peak current is approximately 500 mA.

At time $t_2$, the inductor 32 begins to discharge with a minimum off-time of 1.7 μsec. Assuming that the VOUT connection is lightly loaded, the amount of energy delivered in this single energy pulse satisfies the voltage control loop, and the converter 20 does not command any more energy pulses until the voltage level at the VOUT connection again drops below its lower voltage threshold.

At time $t_3$, the voltage level at the VGD connection has dropped below its lower voltage threshold, but the voltage level at the VOUT connection is still above its lower voltage threshold. This results in an energy pulse to the VGD connection at time $t_4$. However, while the VGD connection is being serviced, the voltage level at the VOUT connection drops below its lower voltage threshold. Thus, at time $t_5$, after the VGD connection has been serviced, the VOUT connection is serviced again.

The converter 20 comprises control circuitry which provides high efficiency power conversion for both light and heavy loads by transitioning between discontinuous and continuous conduction modes based upon the load conditions. For example, at time $t_6$, a transition occurs from the light load to a heavy load. Due to the heavy load, a single energy pulse is not sufficient to force the voltage level at the VOUT connection above its upper voltage threshold before the minimum off-time has expired. Additional charge cycles are therefore required. Since the current through the inductor 32 does not reach zero in this charge cycle, the peak current at the end of the next charge cycle is greater than 0.5 A, which is the peak current of the discontinuous mode. The result is a continuous mode ratcheting of the current through the inductor 32 until either the voltage level at the VOUT connection reaches its upper voltage threshold, or the converter 20 reaches its programmed peak current limit.

At time $t_7$, the voltage level at the VGD connection has dropped below its lower voltage threshold, but the converter 20 continues to service the VOUT connection because it has highest priority until the voltage level at the VGD connection drops below 7.5 V, which is its critical voltage threshold.

Between $t_7$ and $t_8$, the converter 20 reaches its programmed peak current limit which is determined by $R_{PL}$ and VIN. Once this limit is reached, the converter 20 operates in steady state continuous mode with approximately 200 mA of ripple current.

At time $t_8$, the energy transferred from the inductor 32 to the output voltage storage capacitor 40 raises the voltage level of the VOUT connection above its upper voltage threshold. Thereafter, since the voltage level at the VGD connection has dropped below its lower voltage threshold, the converter 20 can service the VGD connection at time $t_9$.

The converter 20 incorporates an adaptive power limit control which modifies the current limit of the converter 20 as a function of input voltage. In order to program the power limit, the output power requirements must first be determined and then an initial efficiency estimate must be made. The value of the programming resistor, $R_{PL}$, is determined by $$R_{PL} = \frac{14.5n}{P_{OUT}} - 6.5\Omega$$

wherein n is the initial efficiency estimate. For 500 mW of output power, and an efficiency estimate of 0.75, the value of $R_{PL}$ is given by $$R_{PL} = \frac{(14.5)(0.75)}{0.5} - 6.5 = 15.25\Omega$$

For decreasing values of $R_{PL}$, the input power limit increases. Therefore, to insure that the converter 20 can supply 500 mW of output power, a power limiting resistor of less than 15Ω must be chosen. For the application circuit shown in FIG. 6, wherein the value of $R_{PL}$ is 6.2Ω, the input power limit of the converter 20 is given by $$PL = \frac{14.5}{15\Omega + 6.5\Omega} = 0.67 \, W$$

This input power limit supports 0.5 W of output power.

It should be noted that the input power limit equation contains an approximation which results in slightly less actual input power than the equation predicts. This discrepancy results from the fact that the average current delivered to the load will be less than the peak current set by the power limit function due to current ripple. However, if the ripple component of the current is kept low, the power limit equation can be used as an adequate estimate of input power. Furthermore, since an initial efficiency estimate is required, sufficient margin can be built into this estimate to insure proper converter operation.

In the application circuit shown in FIG. 6, the value of the inductor 32 is 22 μH. This inductor value works well in this and most applications, but values between 10 μH and 100 μH are also acceptable. Lower inductor values typically offer lower ESR and smaller physical size. In contrast, higher inductor values typically result in larger overall voltage ripple because, once the output voltage level is satisfied, the converter 20 will operate in the discontinuous mode and overshoot will result due to residual energy in the inductor 32.

It is important to keep the ESR of the inductor 32 below 0.15Ω for 500 mW applications. As an example, a Coilcraft DT3316P-223 surface mount inductor having a current rating of 1.5 A and an ESR of 84 mΩ may be used.

Once the value of the inductor 32 is selected, the value of the output voltage storage capacitor 40 may be selected. The value of the output voltage storage capacitor 40 will determine the ripple of the converter 20. More particularly, the charge storage characteristic and the ESR of the output voltage storage capacitor 40 will determine the ripple of the converter 20. The worst case ripple occurs when the inductor 32 is operating at maximum current and is expressed by $$\Delta V = \frac{(I_{CL})^2 L}{2C(V_O - V_I)} + I_{CL}C_{ESR}$$

wherein $\Delta V$ is the output voltage ripple, $I_{CL}$ is the peak current through the inductor 32, L is the value of the inductor 32, C is the value of the output voltage storage capacitor 40, $V_O$ is the output voltage, $V_I$ is the input voltage, and $C_{ESR}$ is the ESR of the output voltage storage capacitor 40.

As an example, a Sanyo OS-CON series surface mount capacitor, having part number 10SN100M, may be used for the output voltage storage capacitor 40. This part has a rated ESR of 90 mΩ at 100 μF. If less than full output power is required, a larger inductor should be used which will result in lower peak currents, and an output capacitor with a higher ESR rating can be used.

The criteria used to select the gate drive voltage storage capacitor 38 are not nearly as severe as for the output voltage storage capacitor 40. The converter 20 does not require a large input voltage decoupling capacitor to operate properly. Thus, a 10 μF is sufficient for this and most applications. It should be noted, however, that optimum efficiency occurs when the value of the gate drive voltage storage capacitor 38 is large enough to decouple the source impedance. This usually occurs for capacitor values in excess of 100 μF.

The power source 30 used in the application circuit shown in FIG. 6 may be a single or dual alkaline cell so as to provide the VOUT connection with a 3.3 V, 5.0 V, or an adjustable output voltage at 500 mW. The VGD connection provides an auxiliary 9 V output, primarily for use in supplying drive current to the MOSFET switches 26 and 28 in the converter 20, but which also can be used for applications requiring an auxiliary output such as a 5 V supply by linear regulating. The converter 20 can start up with the VOUT connection under full load at input voltages typically as low as 0.8 V with a guaranteed maximum of 1 V. Once operating, the typical input voltage required may be as low as 0.5 V, thereby maximizing battery utilization.

The converter 20 provides demanding applications such as pagers and personal data assistants, which require high efficiency from several milli-watts to several hundred milli-watts, with efficiencies of greater than 80% over a wide range of operation. The high efficiency at low output current is achieved by optimizing switching and conduction losses with a low 60 μA quiescent current. At higher output current, the 0.25Ω MOSFET charging switch 26 and the 0.5Ω MOSFET boosting switch 28, along with the continuous mode conduction, provide high power efficiency. Also, the wide input voltage range can accommodate other types of power sources, such as NiCd and NiMH.

Alternative embodiments of the above-described multiplexing technique can also be realized in integrated circuit form. For example, referring to FIG. 8, there is shown a block diagram schematic of a single inductor, multiple output power converter 50 in integrated circuit form along with some associated application circuitry, all of which incorporate the concepts of the above-described multiplexing technique. The converter 50 comprises a modulator control circuit 52, start-up circuitry 54, a MOSFET charging switch 56, a MOSFET boosting switch 58, a voltage monitor 60, a low drop-out linear regulator 62, an external memory power output switch 64, and an external battery charge output switch 66. The associated application circuitry comprises a DC power source 70, an inductor 72, a gate drive voltage schottky flyback diode 74, a negative voltage schottky flyback diode 76, a power source storage capacitor 78, a gate drive voltage storage capacitor 80, a negative voltage storage capacitor 82, an output voltage storage capacitor 84, an input power limiting termination resistor 86, a charge current setting connection resistor 88, and an auxiliary power source 90.

Several of the connections between the internal circuitry of the converter 50 and the external application circuitry are labeled similar to several of the connections associated with the converter 20 described above. Those connections, which include the input voltage connection, VIN, the switch connection, SW, the gate drive connection, VGD, the output voltage connection, VOUT, the input power limiting connection, PLIM, the power ground connection, PGND, and the signal ground connection, SGND, perform functions which are similar to the functions described above for the similarly labeled connections of the converter 20.

Of the other connections, the negative output voltage connection, VNEG, provides a negative output voltage which is generated according to the multiplexing technique of the present invention. As described in detail below, the VNEG connection has the third highest priority in the multiplexing technique of the converter 50, behind the VGD connection and the VOUT connection, respectively. The negative output voltage is typically held at −6 V, which is a convenient voltage value for an LCD display.

A power monitoring connection, PWROK, provides an output that is indicative of when the voltage value at the VOUT connection is not within tolerance (e.g., below its lower threshold). The PWROK connection is typically connected to a low voltage shutdown circuit in a microprocessor.

An external memory power connection, MEM, provides power from either the VOUT connection or a VNICD connection to an external memory. The external memory is supplied by the VOUT connection if the voltage value at the VOUT connection is greater 2.5 V. If the voltage value at the VOUT connection is less than 2.5 V, the external memory is supplied through the VNICD connection.

The VNICD connection provides an alternative power source for the MEM connection. The VNICD connection is connected to the auxiliary power source 90, which is typically a NiCd battery. The voltage provided by the NiCd battery 90 is regulated to 2.5 V by the linear regulator 62, which provides up to 50 µA at the MEM connection for external memory backup power.

A charge current setting connection, ISET, is used to set the charge current for the external NiCd battery 90. The value of the charge current setting connection resistor 88, which is connected between the ISET connection and the VIN connection, determines the amount of charge current that is permitted. The charge current typically ranges from 5 to 50 mA. The average charging current (when the other outputs are not being serviced) is determined by $$I_{CHARGE} = \frac{0.242}{LR_{SET}}$$

A charge enable connection, CHGEN, allows the external NiCd battery to be charged. The CHGEN connection is typically connected to the VOUT connection.

Figure 8:
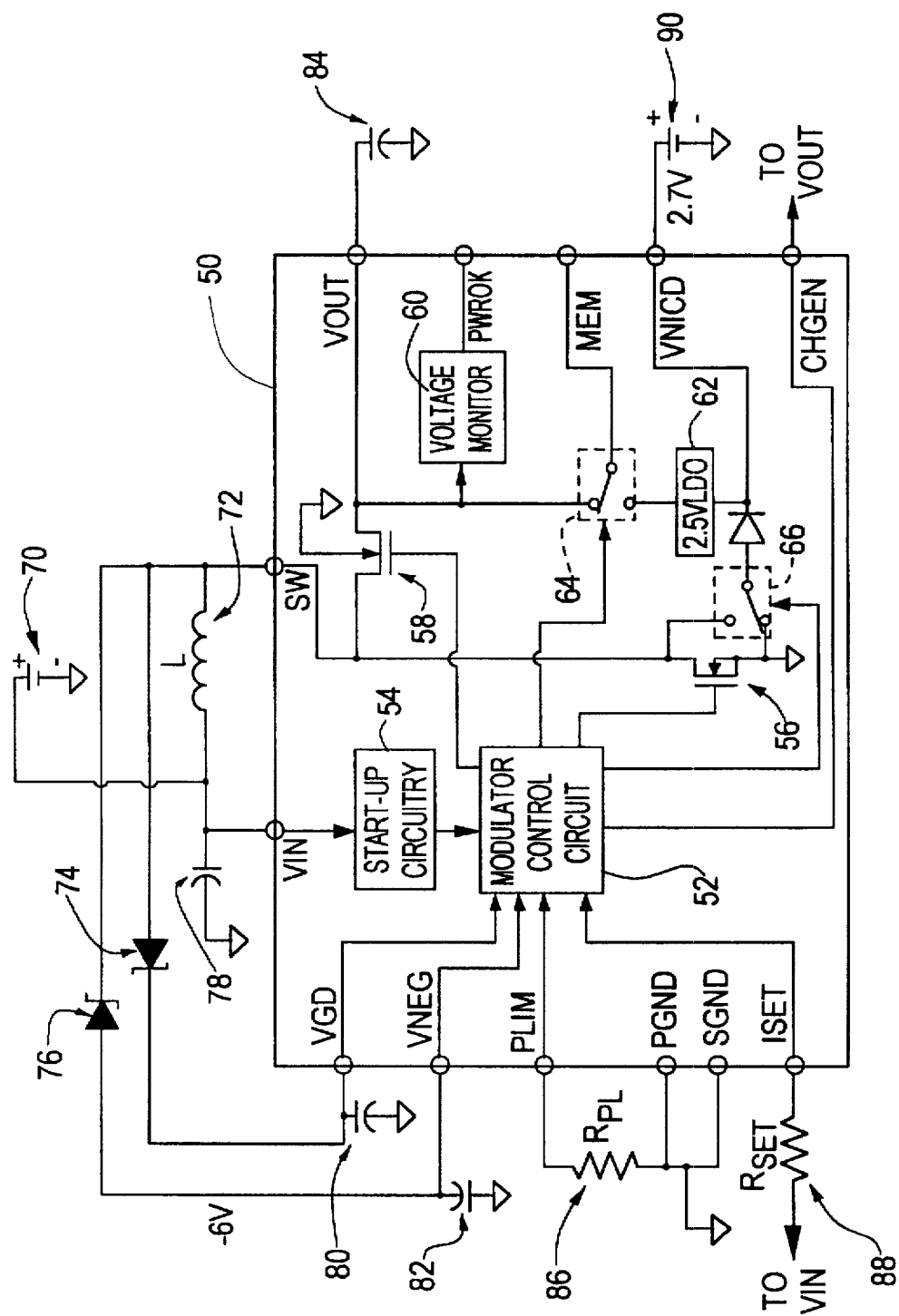
FIG. 8 is a simplified schematic diagram of a single inductor, multiple output power converter which incorporates the concepts of a multiplexing technique in accordance with the present invention.
Figure 9:
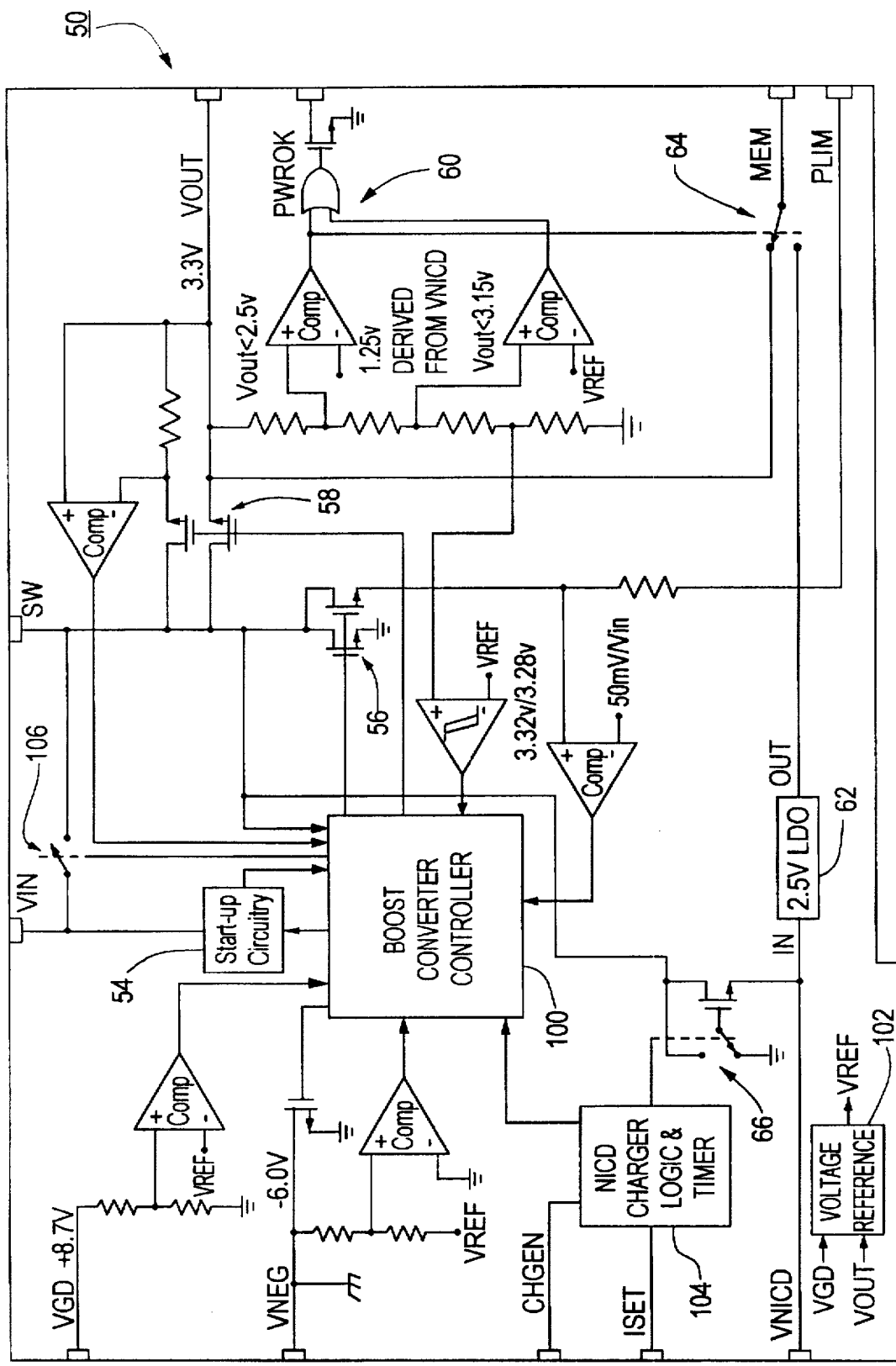
FIG. 9 is a detailed schematic diagram of the single inductor, multiple output power converter shown in FIG. 8.

Referring to FIG. 9, a more detailed schematic diagram of the converter 50 shown in FIG. 8 is provided. In particular, the individual components of the modulator control circuit 52 are shown comprising a boost converter controller 100, a voltage reference 102, an external battery charger logic and timer circuit 104, and an anti-ringing switch 106.

The multiplexing technique of the converter 50 arbitrates between the four prioritized outputs (VGD, VOUT, VNEG, and VNICD) so as to insure an orderly start-up and keep the outputs within regulation. This assumes, of course, that the inductor 72 has been sized properly and that the output loads are within their limits. The thresholds that determine which output gets serviced are as follows:

If VGD<7.6 V, then VGD will get priority for service.

If VGD>7.6 V and VOUT<3.3 V, then VOUT will get priority for service.

If VGD<8.7 V and VOUT>3.3, then VGD will get priority for service.

If VGD>8.7 V and VOUT>3.3 V and |VNEG|<6 V, then VNEG will get priority for service.

If VGD>8.7 V and VOUT>3.3 V and |VNEG|>6 V, then the timer for the NiCd battery charger will begin. VNICD will be serviced if the timer expires before another output requires service.

A small amount of hysteresis has been built into the voltage thresholds to prevent erratic operation due to noise.

Figure 10:
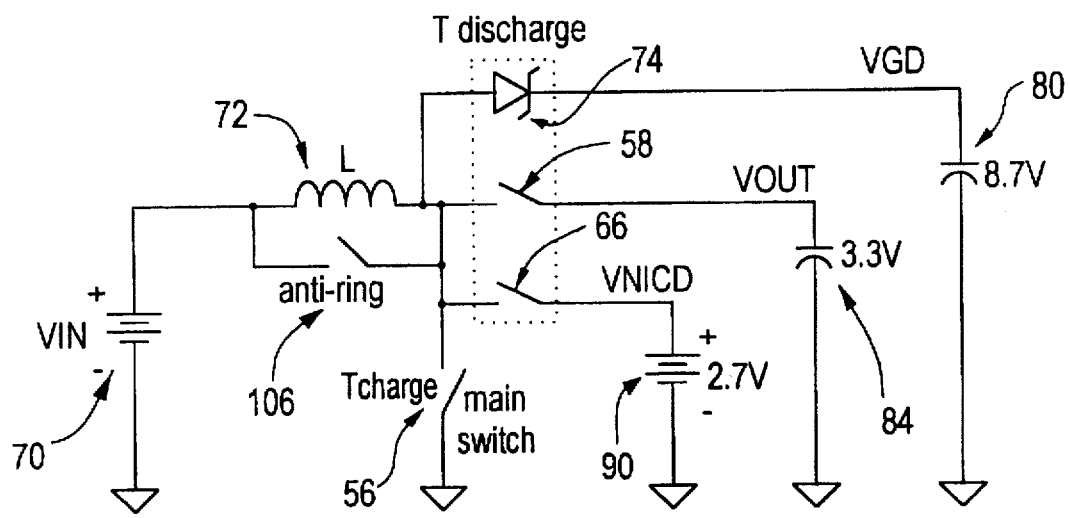
FIG. 10 is a schematic representation of the boost topology for the VGD, VOUT, and VNICD connections in the single inductor, multiple output power converter shown in FIG. 8.

The three outputs providing positive output voltages (VGD, VOUT, and VNICD) use a boost topology as shown in FIG. 10. The main switch, which corresponds to the MOSFET charging switch 56, turns on for a time $T_{charge}$ so as to allow current from the power source 70, represented by VIN, to ramp up in the inductor L, which corresponds to the inductor 72. The converter 50 then determines which output will be serviced and turns on the appropriate switch for a time $T_{discharge}$. The $T_{charge}$ and $T_{discharge}$ times vary depending upon the output being serviced and the state of the current in the inductor 72. The anti-ringing switch 106 shorts the VIN connection to the MOSFET charging switch 56 during zero current intervals.

When the VGD connection has priority for service, the inductor 72 will be charged with current from the power source 70 for a $T_{charge}$ time of $$T_{charge} = 12/VIN \text{ µsec}$$

or until the positive current limit set by $R_{PL}$ is met. When either of the above occur, the main switch 56 will open and the inductor 72 will discharge for a time $T_{discharge}$ with a reverse voltage given by $$V_L = VGD + V_{SCHOTTKY} - VIN$$

The VGD boost switch is the gate drive voltage schottky flyback diode 74. This diode 74 will conduct during the discharge phase if the other positive output switches 58 and 66, as well as the main switch 56, are open. The inductor 72 will discharge to zero current unless the $T_{discharge}$ time is longer than 6.75 µsec.

When the VOUT connection has priority for service, the inductor 72 will be charged in a similar manner and for similar times as for the VGD connection. When the main switch 56 opens, the MOSFET boosting switch 58 closes so as to deliver energy to the output voltage storage capacitor 84. The reverse discharge voltage on the inductor 72 is given by $$V_L = VOUT + V_{SWITCH} - VIN$$

wherein $V_{SWITCH}$ is the voltage drop across the switch 58. The inductor will discharge for 1.75 µsec, or until the current goes to zero.

Since the VOUT connection is the highest power output, it has the greatest impact on efficiency. For that reason, the MOSFET boosting switch 58 is chosen to have low impedance. Also, the MOSFET boosting switch 58 is initially diode connected during the discharge phase. This prevents shoot-through current that would occur if the MOSFET boosting switch 58 and the main switch 56 were closed simultaneously while insuring proper current steering during the transition.

The VNICD connection has the lowest priority for service and is used to recharge the auxiliary power source 90 (i.e the NiCd battery). The VNICD connection does not use voltage thresholds to request service like the other outputs. Rather, the timer circuit 104 (see FIG. 9) is used to control fixed current bursts that are delivered to the external NiCd battery 90 at a fixed rate. The burst rate time, $T_{cycle}$, is set by the charge current setting connection resistor 88 tied to the ISET connection. The timer circuit 104 will only be initiated if the other outputs do not require servicing. The timer circuit 104 will be reset if one of the other outputs requests service. Once the timer circuit 104 reaches the burst rate time $T_{cycle}$, the inductor 72 will be charged with current from the power source 70 for a $T_{charge}$ time of $$T_{charge} = 2.2/VIN \text{ µsec}$$

After time $T_{charge}$, the output switch 66 will be closed so that the inductor 72 may discharge. Since the power requirements for the external NiCd battery 90 are low, synchronous rectification is not required for the VNICD connection. The output switch 66 consists of a diode connected MOSFET. During discharge, a reverse discharge voltage given by $$V_L = VNICD + V_{DIODE} - VIN$$

is imposed across the inductor 72. Discharge continues until the inductor current goes to zero. The cycle time and the average charging current for the VNICD connection are given by the following equations $$T_{cycle} = \frac{(2)(10^{-11})R_{SET}}{VNICD - VIN}$$

$$I_{ave} = \frac{0.242}{LR_{SET}}$$

With L=22 µH and $R_{SET}$=2.2 MΩ, the average charging current of the external NiCd battery 90 would be 5 mA.

The external NiCd battery 90 is used to provide external memory backup power when the voltage value at the VOUT connection is insufficient and when the VOUT connection is being serviced. If the external NiCd battery 90 is not required in the application, the charging function should be disabled by tying the CHGEN connection to the PGND connection and leaving out the charge current setting connection resistor 88.

Figure 11:
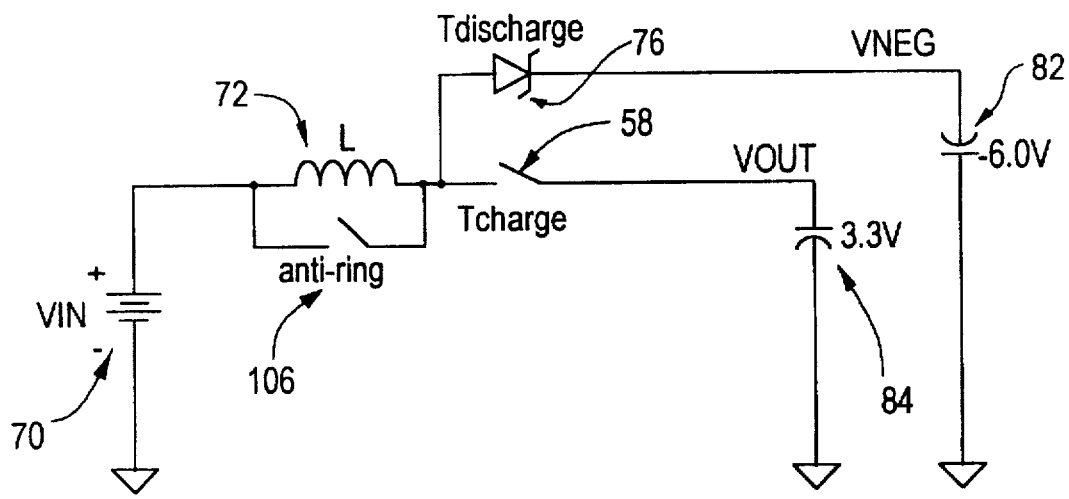
FIG. 11 is a schematic representation of the flyback topology for providing a negative voltage at the VNEG connection in the single inductor, multiple output power converter shown in FIG. 8.

The VNEG connection gets priority for service only if the voltage thresholds at the VOUT and VGD connections are satisfied. In order to produce a negative voltage at the VNEG connection, a flyback technique utilizing the VOUT connection is used. FIG. 11 shows a flyback topology for providing a negative voltage at the VNEG connection.

While the inductor 72 is being charged, the MOSFET boosting switch 58 is closed so as to put a reverse voltage on the inductor 72 given by $$V_L = VIN - VOUT$$

The inductor current then ramps down until a negative current threshold is met (approximately −200 mA). The MOSFET boosting switch 58 is then opened and the voltage across the inductor 72 reverses until it is clamped by the schottky flyback diode 76. The reverse voltage on the inductor 72 is now given by $$V_L = VNEG + V_{DIODE} - VIN$$

The inductor current then ramps up to zero and the cycle is complete.

Figure 12:
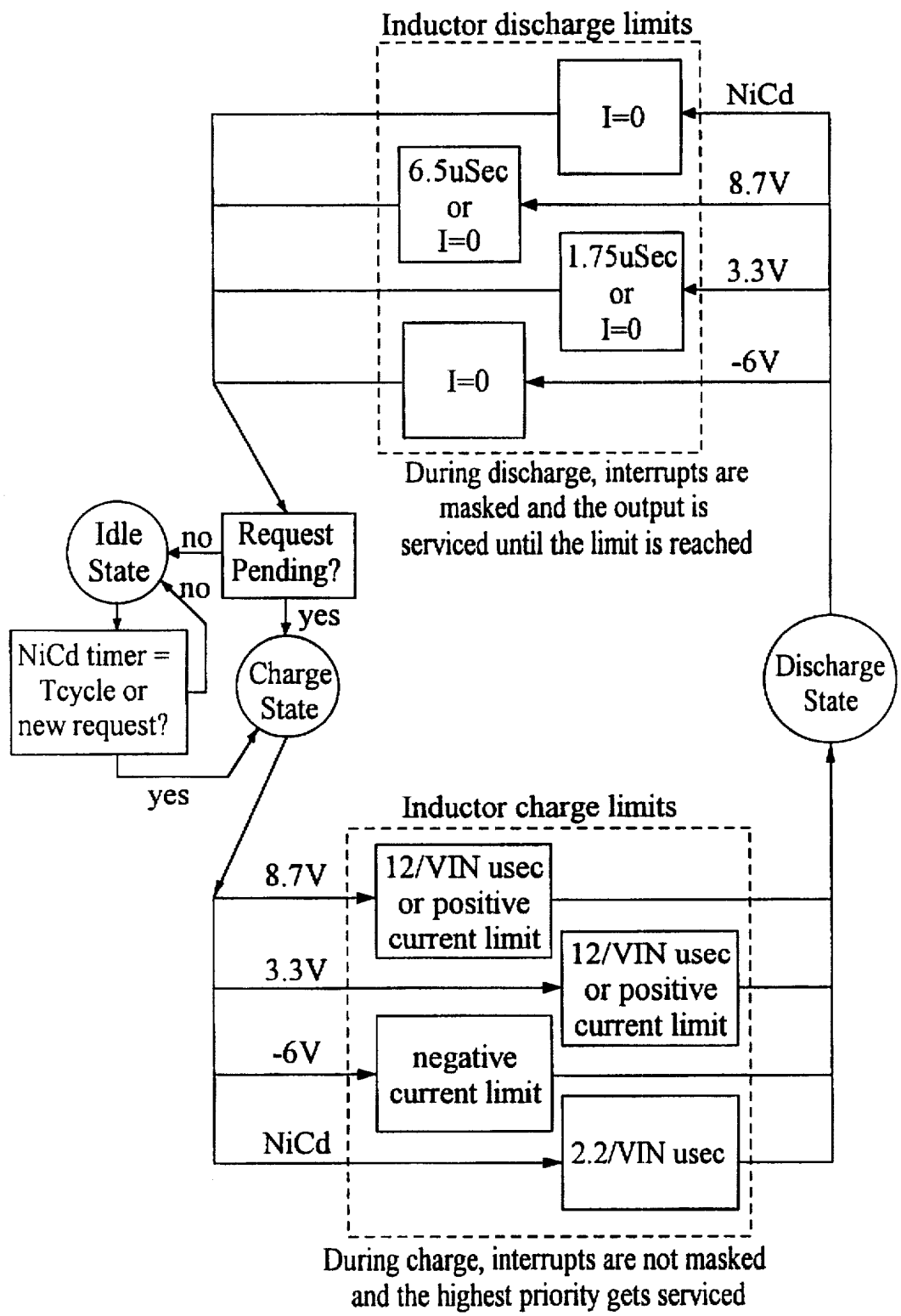
FIG. 12 is a state diagram illustrating the control algorithm that is used by the single inductor, multiple output power converter shown in FIG. 8.

Referring to FIG. 12, there is shown a state diagram illustrating the algorithm that is used by the converter 50 to control charge and discharge currents in the inductor 72. If no requests are made by any of the output connections (i.e. none of the output connections require servicing), the converter 50 waits in the idle state. Once a request occurs, the inductor 72 begins to be charged (charge state). When the inductor current reaches a charge limit (for the highest priority request), the inductor 72 is discharged (discharge state) until a discharge limit is met. Due to the structure of the algorithm, it is possible to change from a lower to a higher priority request during the charge cycle. The timer for the NiCd charger begins when the idle state is entered. If the timer reaches $T_{cycle}$ before another request occurs and the charger is enabled, the VNICD connection will be serviced.

Figure 13:
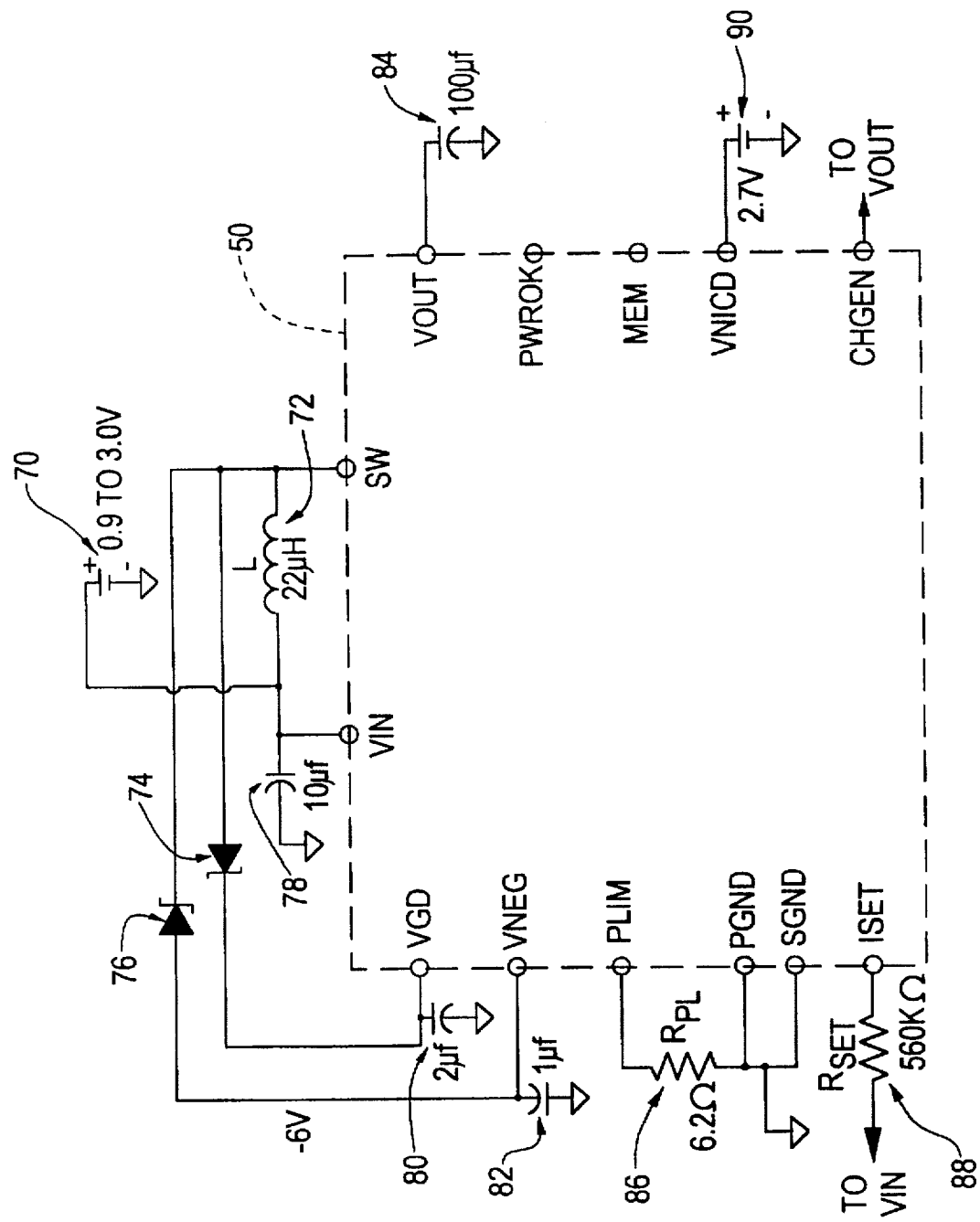
FIG. 13 is a schematic diagram of an application circuit utilizing the single inductor, multiple output power converter shown in FIG. 8.

Referring to FIG. 13, the converter 50 is shown in block diagram form with specific application circuitry connected thereto for providing an 8.7 V output at the VGD connection, a 3.3 V output at the VOUT connection, a −6 V output at the VNEG connection, and a 20 mA charge current at the VNICD connection. The derivation of the output voltages at the VOUT and VGD connections for the converter 50 is similar to the derivation of the corresponding connections for the converter 20, as shown in FIG. 7. However, the derivation of the output voltage and current at the VNEG and the VNICD connections, respectively, differ somewhat.

Figure 14:
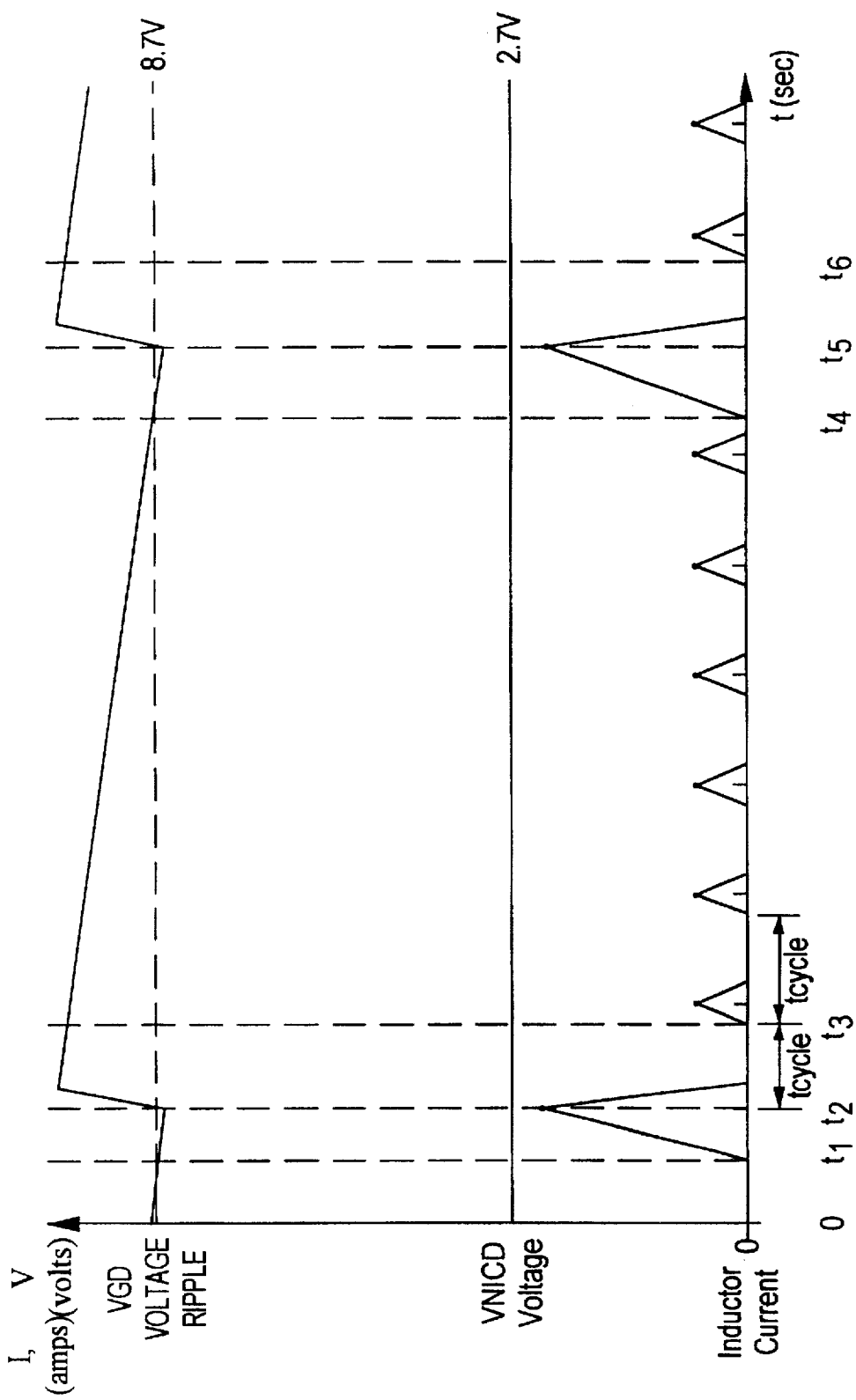
FIG. 14 is a timing diagram illustrating the servicing of the VNICD connection of the single inductor, multiple output power converter in the application circuit of FIG. 13.

Referring to FIG. 14, there is shown a timing diagram illustrating the servicing of the VNICD connection with reference to the VGD connection for the application circuit of FIG. 13. It should be assumed that the VOUT and VNEG connections have little or no load. At time $t_1$, the voltage value at the VGD connection drops below its lower voltage threshold and the inductor 72 charges for a $T_{charge}$ time of 12/VIN μsec. At time $t_2$, the energy stored in the inductor 72 is delivered to the VGD connection. At time $t_3$, the NiCd timer 104 expires and no requests are being made from any of the other output connections. Thus, the inductor 72 charges for 2.2/VIN μsec and the stored energy is delivered to the external NiCd battery 90. Very little ripple can be seen on VNICD voltage waveform due to the low ESR of the external NiCd battery 90. The converter 50 then continues to trickle charge the NiCd battery 90 at a rate set by $T_{cycle}$. At time $t_4$, the VGD connection again requires servicing and the NiCd timer 104 is reset until time $t_5$. At time $t_6$, the NiCd timer 104 expires and the NiCd battery 90 resumes charging.

Figure 15:
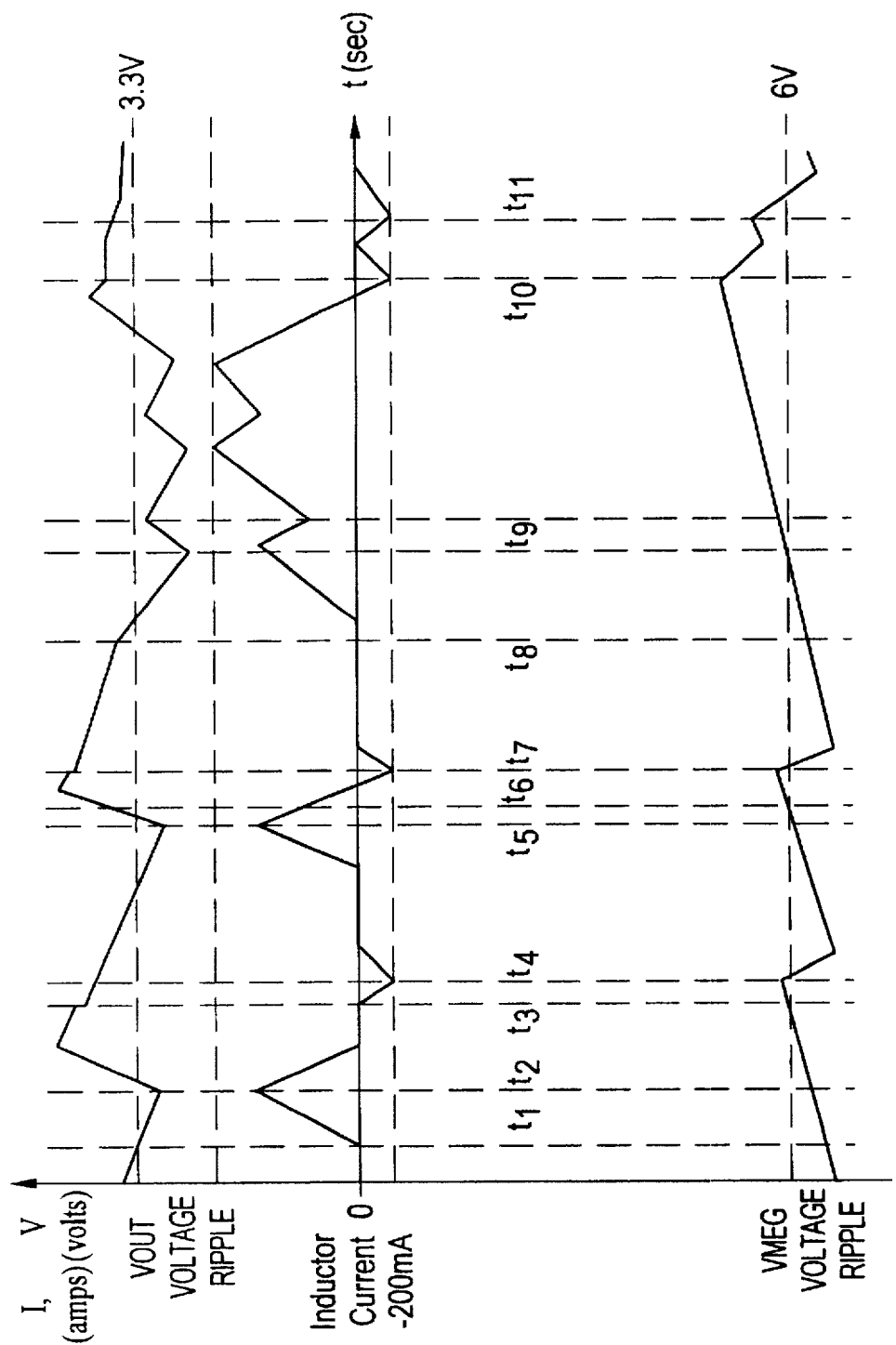
FIG. 15 is a timing diagram illustrating the servicing of the VNEG connection of the single inductor, multiple output power converter in the application circuit of FIG. 13.

Referring to FIG. 15, there is shown a timing diagram illustrating the servicing of the VNEG connection with reference to the VOUT connection for the application circuit of FIG. 13. It should be assumed that the VGD connection is within regulation. At time $t_1$, the voltage value at the VOUT connection drops below its lower voltage threshold and the inductor 72 charges for a $T_{charge}$ time of 12/VIN μsec. At time $t_2$, the energy stored in the inductor 72 is delivered to the VOUT connection. At time $t_3$, the voltage value at the VNEG connection drops below its lower voltage threshold and the inductor 72 is back-charged until the inductor current reaches approximately −200 mA. At time $t_4$, the energy stored in the inductor 72 is delivered to the VNEG connection until the inductor current reaches zero. At time $t_5$, the VOUT connection is again serviced with a transfer of energy from the inductor 72. At time $t_6$, the VNEG connection requires service, so the inductor current continues to flow to the VOUT connection until the inductor current reaches zero at which time the inductor current reverses direction and the inductor current begins to flow from the VOUT connection. At time $t_7$, the negative current threshold is met and the energy stored in the inductor 72 is delivered to the VNEG connection.

It can be clearly seen from FIG. 15 that the slope of the VOUT connection voltage waveform changes between times $t_3$ and $t_4$, as well as between time $t_5$ and $t_6$. This is due to the fact that energy is being taken from the output voltage storage capacitor 84 to back-charge the inductor 72 for the VNEG connection. At time $t_8$, the load on the VOUT connection is increased and the inductor 72 is forced into continuous conduction mode. At time $t_9$, the VNEG connection requests service but the VOUT connection has priority. At time $t_{10}$, the VOUT connection is satisfied and the load on the VOUT connection has been reduced. The inductor 72 is then back-charged so as to deliver energy to the VNEG connection. At time $t_{11}$, the VNEG connection receives a second burst of energy in order to bring the voltage output at the VNEG connection to a value above its lower voltage threshold.

The selection of the storage capacitors 80, 82, and 84 is related to the amount of ripple voltage on each output. The ripple voltage on each output is caused by inductor current flowing into each storage capacitor 80, 82, and 84 and its associated ESR. Since decisions about output servicing depend upon the output voltage levels, it is important that the ripple voltages are within expected values. The ripple voltage for each storage capacitor 80, 82, and 84 can be determined by the following equation $$V_{ripple} = \frac{I_{Lave} T_{discharge}}{C} + \Delta I_L ESR$$

The worst case ripple on all of the outputs occurs when the inductor current decays to zero. Thus, $$I_{Lave} = \frac{I_{peak}}{2} \quad \Delta I_L = I_{peak}$$

The ripple voltage can now be rewritten as $$V_{ripple} = I_{peak}\left[\frac{T_{discharge}}{2C} + ESR\right]$$

Because of the low current requirements of the VGD and the VNEG connections, ceramic capacitors (with almost no ESR) can be used for these outputs. For VIN=1 V, L=22 μH, and $R_{PL}$=6.2Ω, the resulting ripple voltages for some recommended capacitor values are given below in Table 1.

TABLE 1

| Output Voltage Ripple Example | +8.7 V | +3.3 V | -6 V |
|---|---|---|---|
| worst case mode | $I_{max}$ to zero | $I_{max}$ to zero | Discontinuous to zero |
| $I_{peak}$ | 0.74 A | 0.74 A | 0.200 A |
| $T_{discharge}$ | 2.11 μsec | 7.07 μsec | 0.628 μsec |
| Recommended Capacitor | 2x1 μF X7R ceramic | 100 μF OS-CON 10SN100M | 1 μF X7R ceramic |
| Recommended Capacitor ESR | 0 | 0.09 | 0 |
| Resulting $V_{ripple}$ | 390 mV | 93 mV | 63 mV |

The selection of an appropriately sized inductor 72 is critical to the successful operation of the converter 50. The value of 22 μH will maximize both continuous and discontinuous mode efficiency for a 150 mA load on the VOUT connection. If the current load on the VOUT connection is less than 150 mA, the size of the inductor 72 should be increased linearly to maximize efficiency.

For this particular converter 50, the amount of inductance required also depends on the desired ripple current while operating in continuous mode at the low end of the input voltage range. With the value of the input power limiting termination resistor 86 being 6.2Ω and VIN=1 V, the peak current limit is 0.74 A. A 25% ripple current corresponds to 0.185 A. The maximum ripple component and the maximum off-time lead to a required minimum inductance given by $$L = \frac{(VOUT - VIN)(1.75\,\mu sec)}{\Delta I} = \frac{(3.3 - 1)(1.75\,\mu sec)}{(0.185)} = 21.8\,\mu H$$

As an example, the inductor 72 may be a Coilcraft DT3316fP-223 surface mount inductor having a current rating of 1.5 A and a DC resistance of 84 mΩ.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A multiplexing power converter for use with a single inductor for providing multiple power outputs, said power converter comprising:

first switching means, said first switching means having an input terminal and an output terminal, said first switching means being switchable between a high resistance state and a low resistance state;

second switching means, said second switching means having an input terminal and an output terminal, said input terminal of said second switching means being electrically connected to said input terminal of said first switching means, said second switching means being switchable between a high resistance state and a low resistance state;

third switching means, said third switching means having an input terminal and an output terminal, said input terminal of said third switching means being electrically connected to said input terminal of said first switching means and said input terminal of said second switching means, said third switching means being switchable between a high resistance state and a low resistance state; and control means for controlling the switching of said first switching means, said second switching means, and said third switching means, said control means controlling said first switching means to switch between a high resistance state and a low resistance state so that current may flow through said first switching means so as to energize an inductor as needed, said control means controlling said second switching means or said third switching means to switch between a high resistance state and a low resistance state so that current may flow through said second switching means or said third switching means so as to deenergize the inductor and provide multiple power outputs.

2. The power converter as defined in claim 1, wherein said control means controls said first switching means, said second switching means, and said third switching means so that only one switching means is in a low resistance state at any one time.

3. The power converter as defined in claim 2, wherein said second switching means and said third switching means each provide a power output.

4. The power converter as defined in claim 3, wherein said control means prioritizes said second switching means and said third switching means, and wherein said control means controls said second switching means or said third switching means to switch between a high resistance state and a low resistance state based upon which switching means has the highest priority.

5. The power converter as defined in claim 4, wherein said control means monitors the level of the power outputs for said second switching means and said third switching means, and wherein said control means controls said second switching means or said third switching means to switch between a high resistance state and a low resistance state based upon whether the switching means with the highest priority has reached a predetermined power output level.

6. The power converter as defined in claim 3, wherein the power outputs for said second switching means and said third switching means may have either positive or negative voltage values.

7. The power converter as defined in claim 6, wherein a power output having a negative voltage value is derived by backcharging the inductor from a first power output having a positive voltage value and then negatively boosting a second power output with negative voltage from the backcharged inductor.

8. The power converter as defined in claim 7, wherein said control means controls the backcharging of the inductor by controlling said second switching means to switch between a high resistance state and a low resistance state, and wherein said control means controls the negative boosting of the second power output by controlling said third switching means to switch between a high resistance state and a low resistance state.

9. The power converter as defined in claim 1, wherein said control means limits the current that may flow through said first switching means.

10. The power converter as defined in claim 1, wherein said control means limits the current that may flow through said second switching means and said third switching means.

11. The power converter as defined in claim 1, wherein said control means controls said first switching means to switch at a fixed modulation frequency until a first power output reaches a predetermined power output level, and then controls said first switching means to switch at a variable modulation frequency.

12. A multiplexing power converter for use with a single inductor for providing multiple power outputs, said power converter comprising:

first switching means, said first switching means having an input terminal and an output terminal, said first switching means being switchable between a high resistance state and a low resistance state;

rectifying means, said rectifying means having an input terminal and an output terminal, said input terminal of said rectifying means being electrically connected to said input terminal of said first switching means;

second switching means, said second switching means having an input terminal and an output terminal, said input terminal of said second switching means being electrically connected to said input terminal of said first switching means and said input terminal of said rectifying means, said second switching means being switchable between a high resistance state and a low resistance state; and control means for controlling the switching of said first switching means and said second switching means and for monitoring the level of multiple power outputs, said control means controlling said first switching means to switch between a high resistance state and a low resistance state so that current may flow through said first switching means so as to energize an inductor as needed, said rectifying means providing a path for current to flow from the inductor so as to deenergize the inductor and provide a first power output, said control means controlling said second switching means to switch between a high resistance state and a low resistance state after the first power output has reached a predetermined power output level so that current may flow through said second switching means so as to deenergize the inductor and provide a second power output.

13. The power converter as defined in claim 12, wherein said control means controls said first switching means and said second switching means so that only one switching means is in a low resistance state at any one time.

14. The power converter as defined in claim 12, wherein said control means limits the current that may flow through said first switching means.

15. The power converter as defined in claim 12, wherein said control means limits the current that may flow through said second switching means.

16. The power converter as defined in claim 12, wherein said control means controls said first switching means to switch at a fixed modulation frequency until the first power output reaches a predetermined power output level, and then controls said first switching means and said second switching means to switch at variable modulation frequencies.

17. A multiplexing power converter for use with a single inductor, said power converter comprising:

first switching means, said first switching means having an input terminal and an output terminal, said first switching means being switchable between a high resistance state and a low resistance state;

second switching means, said second switching means having an input terminal and an output terminal, said input terminal of said second switching means being electrically connected to said input terminal of said first switching means, said second switching means being switchable between a high resistance state and a low resistance state; and control means for controlling the switching of said first switching means and said second switching means and for monitoring multiple voltage levels, said control means controlling said first switching means to switch between a high resistance state and a low resistance state so that current may flow through said first switching means so as to energize an inductor as needed, said control means monitoring a first voltage level for comparison with a first predetermined voltage level, said control means controlling said second switching means to switch between a high resistance state and a low resistance state after the first voltage level has reached the first predetermined voltage level so that current may flow through said second switching means so as to deenergize the inductor and provide a power output.

18. The power converter as defined in claim 17, wherein said control means controls said first switching means and said second switching means so that only one switching means is in a low resistance state at any one time.

19. The power converter as defined in claim 17, wherein said control means limits the current that may flow through said first switching means.

20. The power converter as defined in claim 17, wherein said control means limits the current that may flow through said second switching means.

21. The power converter as defined in claim 17, wherein said control means controls said first switching means to switch at a fixed modulation frequency until the first voltage level has reached the first predetermined voltage level, and then controls said first switching means to switch at a variable modulation frequency.

22. The power converter as defined in claim 17, wherein said control means monitors the voltage level of the power output for comparison with a second predetermined voltage level.

23. A multiplexing power converter for use with a single inductor for providing multiple power outputs, said power converter comprising:

first switching means, said first switching means having an input terminal and an output terminal, said first switching means being switchable between a high resistance state and a low resistance state;

first rectifying means, said rectifying means having an input terminal and an output terminal, said input terminal of said rectifying means being electrically connected to said input terminal of said first switching means;

second switching means, said second switching means having an input terminal and an output terminal, said input terminal of said second switching means being electrically connected to said input terminal of said first switching means and said input terminal of said first rectifying means, said second switching means being switchable between a high resistance state and a low resistance state;

second rectifying means, said rectifying means having an input terminal and an output terminal, said output terminal of said rectifying means being electrically connected to said input terminal of said first switching means, said input terminal of said first rectifying means, and said input terminal of said second switching means; and control means for controlling the switching of said first switching means and said second switching means and for monitoring the level of multiple power outputs, said control means controlling said first switching means to switch between a high resistance state and a low resistance state so that current may flow through said first switching means so as to energize an inductor as needed, said first rectifying means providing a path for current to flow from the inductor so as to deenergize the inductor and provide a first power output, said control means controlling said second switching means to switch between a high resistance state and a low resistance state after the first power output has reached a first predetermined power output level so that current may flow through said second switching means so as to deenergize the inductor and provide a second power output, said second rectifying means providing a path for current to flow to the inductor after the second power output has reached a second predetermined power output level so as to deenergize the inductor and provide a third power output.

24. The power converter as defined in claim 23, wherein said control means controls said first switching means and said second switching means so that only one switching means is in a low resistance state at any one time.

25. The power converter as defined in claim 23, wherein said control means limits the current that may flow through said first switching means.

26. The power converter as defined in claim 23, wherein said control means limits the current that may flow through said second switching means.

27. The power converter as defined in claim 23, wherein said control means controls said first switching means to switch at a fixed modulation frequency until the first power output has reached the first predetermined power output level, and then controls said first switching means to switch at a variable modulation frequency.

28. The power converter as defined in claim 23, wherein the first and second power outputs have positive voltage values and the third power output has a negative voltage value.

29. The power converter as defined in claim 28, wherein the third power output is derived by backcharging the inductor from the second power output and then negatively boosting the third power output with negative voltage from the backcharged inductor.

30. The power converter as defined in claim 29, wherein said control means controls the backcharging of the inductor by controlling said second switching means to switch between a high resistance state and a low resistance state.

31. A method for providing multiple power outputs using a single inductor, said method comprising the steps of:
providing a first low resistance path for current to flow from a power source through an inductor so as to energize the inductor as needed;
providing a second low resistance path for current to flow from the inductor so as to deenergize the inductor and provide a first power output;
comparing the level of the first power output to a first predetermined power output level; and
if the level of the first power output has reached the first predetermined power output level, providing a third low resistance path for current to flow from the inductor so as to deenergize the inductor and provide a second power output.

32. The method as defined in claim 31, wherein said step of providing a first low resistance path comprises switching a switch between a high resistance state and a low resistance state.

33. The method as defined in claim 31, wherein said step of providing a second low resistance path comprises switching a switch between a high resistance state and a low resistance state.

34. The method as defined in claim 31, wherein said step of providing a second low resistance path comprises providing a diode connection to the inductor.

35. The method as defined in claim 31, wherein said step of providing a third low resistance path comprises switching a switch between a high resistance state and a low resistance state.

36. The method as defined in claim 31, further comprising the steps of:
comparing the level of the second power output to a second predetermined power output level; and
if the level of the second power output has reached the second predetermined power output level, providing a fourth low resistance path for current to flow to the inductor so as to deenergize the inductor and provide a third power output.

37. The method as defined in claim 36, wherein said step of providing a fourth low resistance path comprises switching a switch between a high resistance state and a low resistance state.

38. The method as defined in claim 36, wherein said step of providing a second low resistance path comprises providing a diode connection to the inductor.

39. The method as defined in claim 36, further comprising the steps of:
comparing the level of the third power output to a third predetermined power output level; and
if the level of the third power output has reached the third predetermined power output level, providing a fifth low resistance path for current to flow from the inductor so as to deenergize the inductor and provide a fourth power output.

40. The method as defined in claim 39, wherein said step of providing a fifth low resistance path comprises switching a switch between a high resistance state and a low resistance state.

41. A power converter that utilizes a single inductor for providing multiple power outputs, said power converter comprising:
a power source;
an inductor having a first terminal and a second terminal, said first terminal of said inductor being electrically connected to said power source;
first switching means, said first switching means having an input terminal and an output terminal, said input terminal of said first switching means being electrically connected to said second terminal of said inductor, said first switching means being switchable between a high resistance state and a low resistance state;
first rectifying means, said rectifying means having an input terminal and an output terminal, said input terminal of said rectifying means being electrically connected to said second terminal of said inductor;
second switching means, said second switching means having an input terminal and an output terminal, said input terminal of said second switching means being electrically connected to said second terminal of said inductor, said second switching means being switchable between a high resistance state and a low resistance state; and
control means for controlling the switching of said first switching means and said second switching means and for monitoring the level of multiple power outputs, said control means controlling said first switching means to switch between a high resistance state and a low resistance state so that current may flow from said power source through said inductor and said first switching means so as to energize said inductor as needed, said rectifying means providing a path for current to flow from said inductor through said rectifying means so as to deenergize said inductor and provide a first power output, said control means controlling said second switching means to switch between a high resistance state and a low resistance state after the first power output has reached a first predetermined power output level so that current may flow from said inductor through said second switching means so as to deenergize said inductor and provide a second power output.

42. The power converter as defined in claim 41, further comprising second rectifying means, said rectifying means having an input terminal and an output terminal, said output terminal of said rectifying means being electrically connected to said second terminal of said inductor, said control means for controlling the switching of said first switching means and said second switching means and for monitoring the level of multiple power outputs, said second rectifying means providing a path for current to flow to said inductor through said second rectifying means after the second power output has reached a second predetermined power output level so as to deenergize said inductor and provide a third power output.

43. The power converter as defined in claim 42, further comprising third switching means, said third switching means having an input terminal and an output terminal, said input terminal of said third switching means being electrically connected to said second terminal of said inductor, said third switching means being switchable between a high resistance state and a low resistance state, said control means controlling said third switching means to switch between a high resistance state and a low resistance state after the third power output has reached a third predetermined power output level so that current may flow from said inductor through said second switching means so as to deenergize said inductor and provide a fourth power output.

44. The power converter as defined in claim 43, wherein the fourth power output provides charging current to a rechargeable battery.

45. The power converter as defined in claim 41, wherein said control means initially operates off power from said power source, and wherein said control means operates off power from the first power output after the first power output has reached the first predetermined power output level.

* * * * *